United States Patent [19]

Anderson

[11] Patent Number: 5,094,705
[45] Date of Patent: Mar. 10, 1992

[54] METHOD AND APPARATUS FOR PRODUCING CONTINUOUS BAND EXPANDABLE AND COLLAPSIBLE SHIELDING MATERIAL

[75] Inventor: Richard N. Anderson, Owensboro, Ky.

[73] Assignee: Hunter Douglas Inc., Upper Saddle River, N.J.

[21] Appl. No.: 479,792

[22] Filed: Feb. 14, 1990

[51] Int. Cl.$^5$ .............................................. B31C 13/00
[52] U.S. Cl. .................................... 156/184; 156/494; 156/200; 156/190
[58] Field of Search ............... 156/184, 197, 200, 198, 156/193, 290, 291, 156, 494, 495, 496, 162, 189, 190, 192

[56] References Cited

U.S. PATENT DOCUMENTS

| Re. 30,254 | 4/1980 | Rasmussen | 156/291 |
|---|---|---|---|
| Re. 31,129 | 1/1983 | Rasmussen | 156/291 |
| 3,963,549 | 6/1976 | Rasmussen | 156/291 |
| 4,288,485 | 9/1981 | Suominen | 428/12 |
| 4,388,354 | 6/1983 | Suominen | 428/12 |
| 4,450,027 | 5/1984 | Colson | 156/461 |
| 4,603,072 | 7/1986 | Colson | 156/461 |
| 4,631,108 | 12/1986 | Colson | 156/461 |
| 4,677,012 | 6/1987 | Anderson | 156/197 |
| 4,732,630 | 3/1988 | Schnebly | 156/197 |

Primary Examiner—David A. Simmons
Assistant Examiner—Robert Barker
Attorney, Agent, or Firm—Fleit, Jacobson, Cohn, Price, Holman & Stern

[57] ABSTRACT

A method and apparatus for forming expandable and collapsible shielding material wherein adhesive is applied to one side of a flat tubular strip which is wound around support wheels, the adhesive bonds together successive layers of strip to form a continuous loop of stacked strip. During the winding of the strip, the strip is maintained in a flat, straight condition for a time sufficient to allow the adhesive to achieve an initial set, thereby preventing the final product from having a curved set. After the desired number of layers are wound into the loop, the loop is removed and cut through at one point to form a single, straight stacked section of definite length which is expandable and collapsible to form a shielding or insulating material having parallel hollow cells running perpendicular to the direction of expansion and collapse.

23 Claims, 4 Drawing Sheets

METHOD AND APPARATUS FOR PRODUCING CONTINUOUS BAND EXPANDABLE AND COLLAPSIBLE SHIELDING MATERIAL

BACKGROUND OF THE INVENTION

1. Technical Field of the Invention

The invention relates to expandable and collapsible shielding materials having parallel hollow cells running perpendicular to the direction of expansion and collapse which are often used as movable window blinds, and in particular to a continuous band method for producing such a material. Furthermore, the invention includes an apparatus for practicing the method.

2. Description of Related Art

Such shielding materials are now well known as a means of providing a movable insulating blind for windows. Examples of such material are shown in U.S. Pat. Nos. Re. 30,254 to Rasmussen, 4,388,354 to Suominen, and 4,603,072 to Colson. While the products are known, the existing methods of producing these types of shielding materials economically and in large quantities are generally less than satisfactory.

U.S. Pat. Nos. 4,288,485 to Suominen and Re. 31,129 to Rasmussen both disclose methods for producing expandable and collapsible type insulating material. Both of these methods consist basically of applying adhesive to one side of a flat, tubular strip and then winding it onto a receiving wheel or wheels to produce a loop of tubular layers which are bonded together one on top of another.

One significant problem with this method of manufacture is that the adhesive between the layers dries while the loop is being wound up in a curved state. Therefore, the resulting stack of tubular layers has a curved set, even after it is cut and pulled into a straight section. This curved set in the final product causes the resulting product to have an unattractive appearance due to warpage. The warpage is often not initially present, but shows up some time later due to the fabric memory.

U.S. Pat. Nos. 4,450,027 and 4,631,108 to Colson show an alternative method and apparatus for making a similar product. But while this method has overcome the problem of the curved set, it has done so by winding the fabric onto a flat rack which requires very complicated machinery and speed control due to the constantly changing velocity of the fabric as it is wound onto the rack.

It is therefore an object of this invention to provide a method and apparatus for producing a continuous band expandable and collapsible shielding material which does not have a curved set and therefore is free from discontinuities, warps and uneven lines associated with such a curved set.

SUMMARY OF THE INVENTION

The methods of producing an expandable and collapsible shielding material having parallel hollow cells running perpendicular to the direction of expansion and collapse according to the invention include the following steps. A strip of flattened tubular material is provided and adhesive is then applied thereto. The flattened tubular material may be formed by folding over the edges of a flat strip material, or a prefabricated tubular material with cross-sectionally closed loop can be used as well. Such a closed tubular section is known from the patent to Rasmussen, referred to above. Suitable materials include thin flexible plastics or woven and non-woven fabrics.

The flattened tubular strip is wound around a support means to create a closed loop of a number of superimposed layers of bonded strip. During winding, a first portion of the loop is tensioned such that it is in at least a substantially straight condition. Later, tension is reduced in a second portion of the loop starting at a point near where the loop deflects from the straight condition of the first portion. The strip is initially directed onto the loop at a second point, to provide travel over at least part of the first portion the strip while the strip is in contact with the outer layer of the loop. The duration of the travel over at least part of the first portion is selected so that the adhesive which binds the strip to the outer layer of the loop, achieves at least an initial set. Thereafter, the initial set and tension reduction are controlled so that after the deflecting point of the loop, permanent displacement of the fed strip, relative to the underlying strip layer, is kept within a predetermined limit. Lastly, the stacked loop in a direction is cut approximately perpendicular to the longitudinal direction of the bonded strips after a predetermined number of layers have been bonded so as to form the shielding material.

The apparatus according to the invention includes means for continuously supplying a flattened, tubular strip. Also provided is means for applying adhesive to one side of the flat tubular strip, i.e., either to the underside of the strip before it is fed onto the loop or to the top side of the loop before the new layer is added. First and second support means spaced by a predetermined distance are provided for forming and supporting the continuous loop of successively stacked layers as they are added. The first support means has at least one driving wheel located a sufficient distance from the point where the new strip is added to allow the applied adhesive to achieve an initial set before each successive layer of the loop passes the driving wheel. The second support means may be provided as an idler wheel. Means for compressing each successive layer of the loop onto the preceding layer is also included in the apparatus.

BRIEF DESCRIPTION OF THE DRAWING

The features and advantages of the invention will be more readily apparent from the following detailed description of the preferred embodiments illustrated in the drawing figures, wherein.

DETAILED DESCRIPTION OF THE PREFERRED EMBODIMENTS

Figure 1:
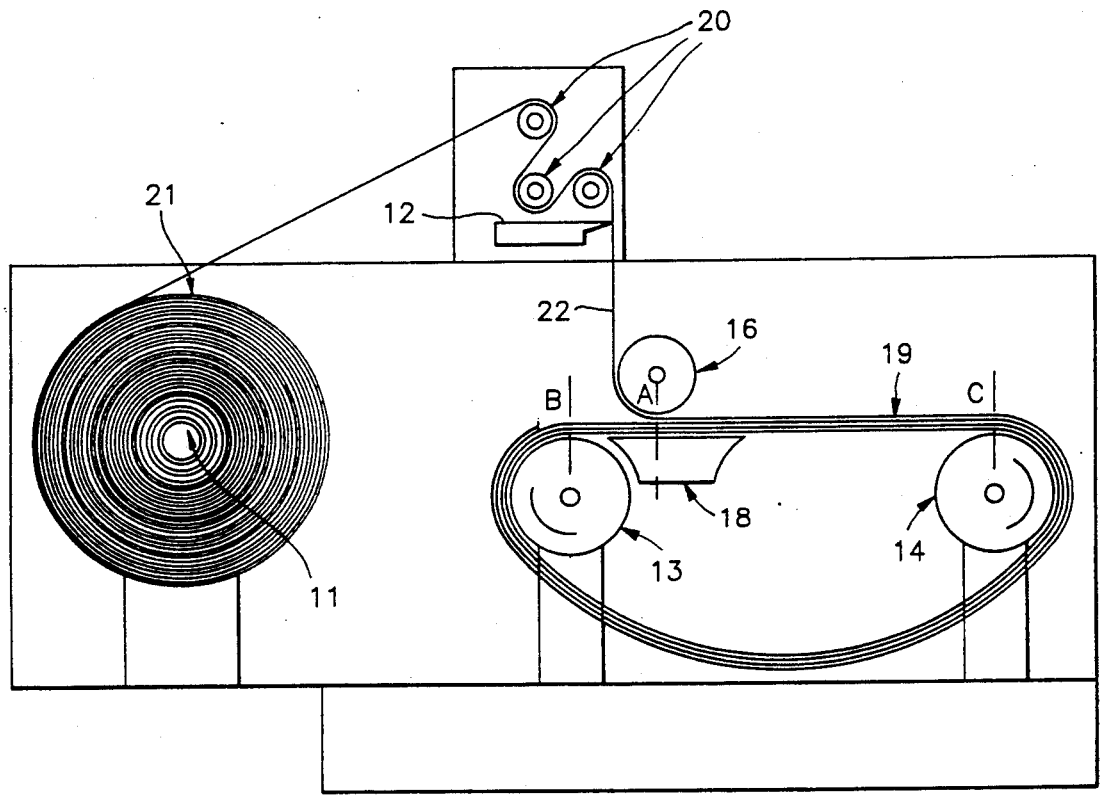
FIG. 1 is a schematic side view illustrating one embodiment of the method and apparatus of the present invention.
Figure 3:
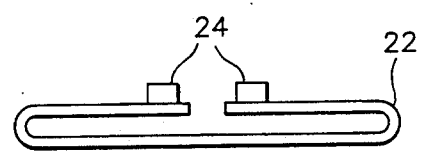
FIG. 3 is a cross section of one layer of folded fabric with applied adhesive.

Referring to FIG. 1, the flattened tubular strip is supplied in the form of a flat non-tubular strip 21 from a supply reel 11. The flat strip 21 is folded and creased into a flat, generally tubular shape by a folding means 20. A suitable device for folding the flat strip 21 into the flattened tubular strip 22 is disclosed in U.S. Pat. No. 4,631,108 to Colson. A cross-section of the flattened tubular strip 22 is shown in FIG. 3. The tube is actually an open section with the folded over edges nearly, but not actually touching. Thin flexible materials such as plastics or woven and non-woven fabrics have been found suitable as material for the flattened tubular strip 22.

In an alternative embodiment, the flattened tubular strip 22 is pre-folded and stored on reels, in which case the supply reel 11 would supply folded flattened tubular strip 22 directly to the adhesive applicator without the need for the folding means 20. A third alternative in this area is to provide from the supply reel 11 a prefabricated tubular material with a cross-sectionally continuous closed loop. This also eliminates the need for the folding means 20.

Referring again to FIG. 1, after the flattened tubular strip 22 is formed by the folding means 20 an adhesive applicator 12 applies adhesive to one side of the flattened tubular strip 22. FIG. 3 illustrates how, in the preferred embodiment, two lines of adhesive 24 are applied close to the folded over edges of the flattened tubular strip 22. In an alternative embodiment, the adhesive 24 is applied to the outer surface of the loop 19 at a point before point (A) where the new layer is added. This is accomplished by relocating the new adhesive applicator 12, for example, in the region of point (B).

The flattened tubular strip 22, with the adhesive 24 applied, is stacked into layers by winding into a continuous loop 19. A first portion of the loop, between point (B) and point (C) is maintained in a straight and flat condition. At the point (A) where each new layer of flattened tubular strip 22 is added, the loop 19 is compressed by squeezing it between a pinch roller 16 and a platen 18. The distance that each new layer of strip 22 travels from point (A) to point (C) is defined by the time required for the adhesive 24 to achieve an initial set and the running speed of the process, and can easily be determined by one skilled in the art using routine tests or calculations based on the specific adhesive used. With conventional adhesives, this time period is usually as long as 10–15 seconds.

In one alternative embodiment, where the adhesive applicator 12 is replaced by an ultrasonic welding apparatus, this time period is significantly decreased. In this embodiment the ultrasonic welder melts two thin lines of the flat tubular strip in the same location that the adhesive 24 would otherwise be applied as shown in FIG. 3. The melted lines of strip are then bonded to the preceding layer of flattened tubular strip 22 when it is compressed between the pinch roller 16 and platen 18. The suitable ultrasonic welding processes are very fast, the time required for setting being in the range of one tenth (1/10) of a second.

After the adhesive 24 has achieved an initial set, the loop 19 passes around a driving wheel 14 which controls the winding speed of the loop 19. It is the distance (A)–(C) which determines where the driving wheel 14 is located. Preferably the axis of the driving wheel 14 is located vertically, directly below point (C). The driving wheel may be driven by a variety of known controllable rotary power devices such as a variable speed electric motor.

After passing around the driving wheel 14 and before the next layer of flattened tubular strip 22 is added, the loop 19 passes over an idler wheel 13. The idler wheel 13 may be equipped with an adjustable drag brake in order to adjust the tension on the upper portion of the loop 19 if necessary.

Figure 8:
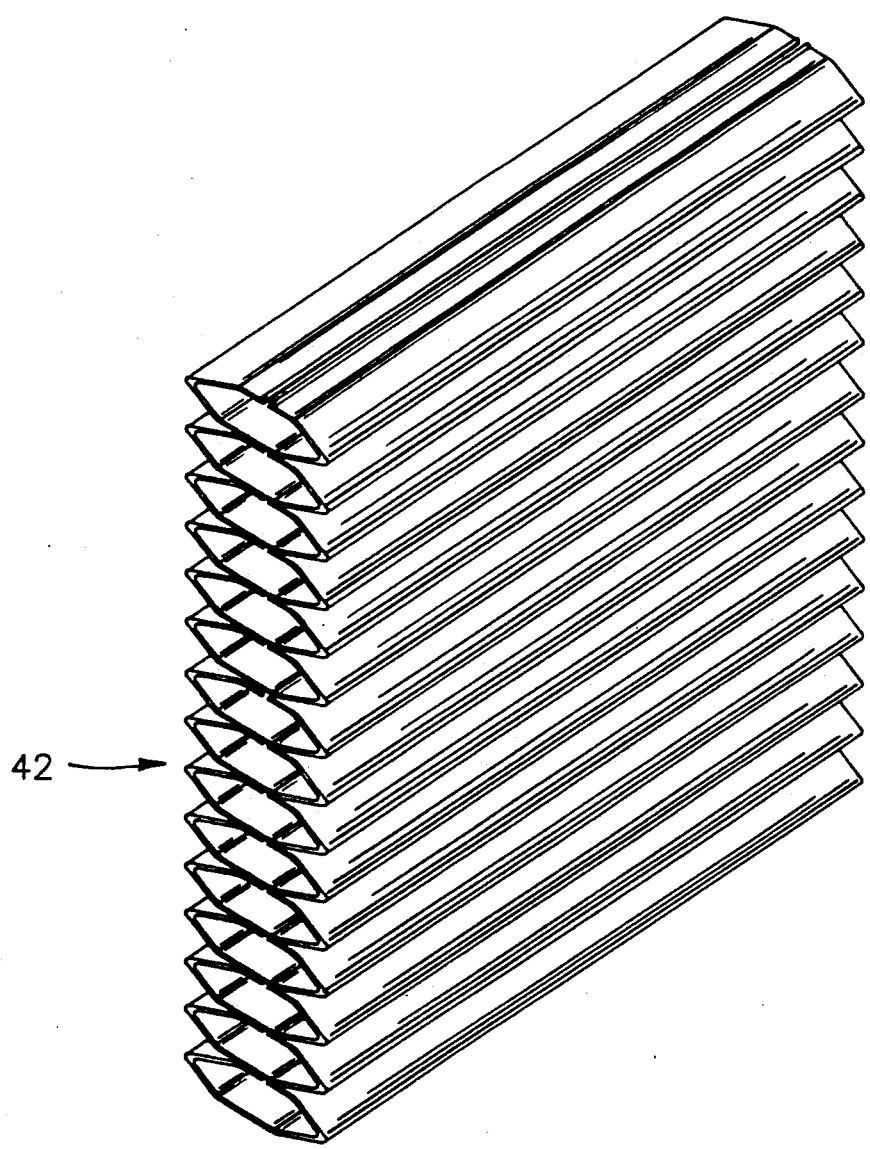
FIG. 8 is a perspective view of the honeycomb insulating material made by the present invention.

When the desired number of layers of flattened tubular strip 22 are wound onto the loop 19, the loop 19 is removed from the supporting wheels 13, 14. The loop 19 is then cut at one point and straightened to form a straight stack of flattened tubular strip 22. This stack is expandable to form the honeycomb insulating material 42 shown in FIG. 8.

Figure 2:
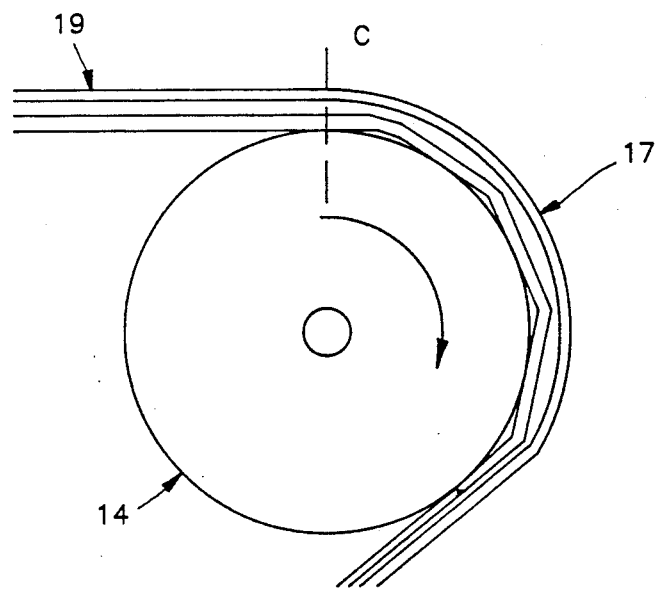
FIG. 2 is a partial enlarged side view in the area of the driving wheel in one embodiment of the invention.

An important feature of this method is that as the loop 19 passes around the driving wheel 14, it is not under significant tension and is therefore not pulled tightly against the driving wheel 14. This is illustrated in FIG. 2. The momentum of the straight portion of the loop 19 tends to cause the loop 19 to continue in a straight line after it passes point (C). This momentum force counteracts the tension in the loop 19 to prevent it from being stretched around the driving wheel 14. Because the loop 19 is not stretched tightly around the driving wheel 14, the outer layers of flattened tubular strip 22 are not significantly stretched as they round the curve, hence the adhesive lines 24 are not stretched as they continue to set up. If the adhesive lines 24 were allowed to stretch at this point they would plasticly deform, resulting in the outer layers being slightly longer when they finally dried. This would create a curved set to the material when it was cut and straightened into a single panel of honeycomb insulating material.

The enlarged view in FIG. 2 shows the condition of the loop 19 as it passes around the driving wheel 14. The layers of the loop 19 are all still the same length, however, as the loop 19 travels around the curve of the driving wheel 14 the outer layers need to follow a longer path than the inner layers. Because the outer layers are not stretched, as discussed above, the inner layers compensate for this difference in arc length by bunching up. This bunching does not cause a separation of the layers because the adhesive already has an initial set and the flat tubular strips 22 are expandable which allows them to fill any spaces that would otherwise be created by the bunching.

The loop 19 continues in a semi-relaxed or tension reduced state, throughout a second portion, from point (C) to point (B) where tension is reapplied due to the force induced by the driving wheel 14. As the loop 19 passes around the idler wheel 13, it is not pulled tightly against the idler wheels because the momentum of the bottom portion of the loop 19 counteracts the tension caused by the weight of the loop 19. The loop 19 here behaves approximately in an inverted mirror image of its behavior around the driving wheel 14.

Figure 4:
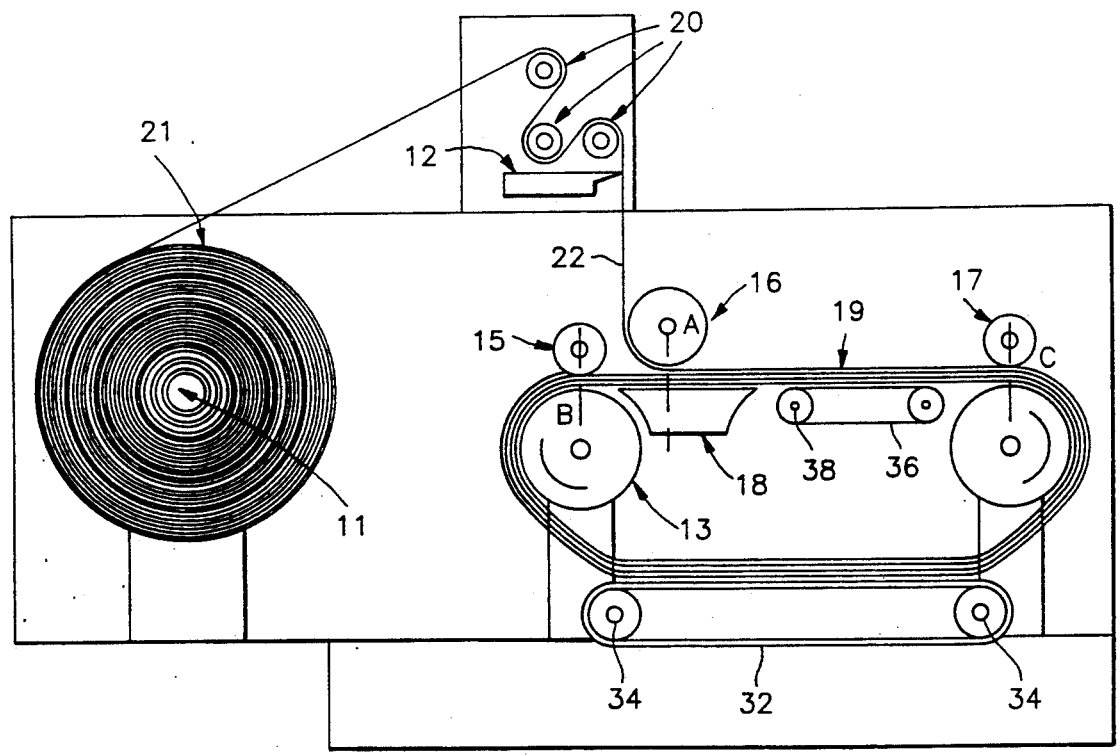
FIG. 4 is a schematic side view illustrating an alternate embodiment of the invention.

To this point a basic method and apparatus according to the invention have been described. Referring to FIG. 4, certain modifications to this basic method and apparatus will now be described. The modifications disclosed are alternative embodiments which may or may not be necessary depending on particular conditions of production.

For certain applications, compression rollers 15, 17 may be added to apply compression at points (B) and (C). The additional compression at these points ensures that the layers of flattened tubular strip 22 are properly adhered to provide a uniform appearance. The compression rollers 15, 17 may also be used to adjust tension in the loop 19. Tension adjustments may be necessary depending on the type of material used for the flattened tubular strip 22 and the adhesive process used in order to ensure that the loop is in a relatively relaxed state as it passes around the driving wheel 14 and idler wheel 13.

Figure 7:
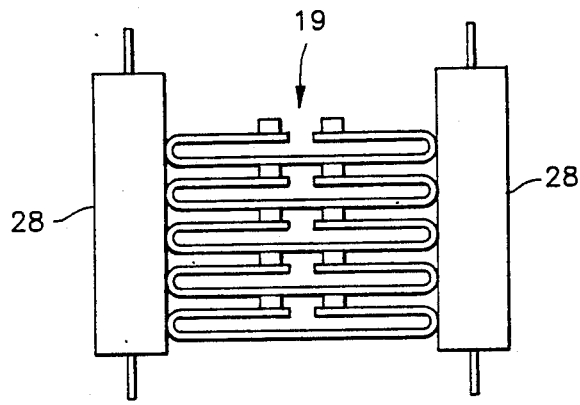
FIG. 7 schematically shows side rollers and a cross section of the loop of the invention.

Side rollers 28 may also be desirable in order to provide additional alignment for the stacked layers of the loop 19, as shown in FIG. 7. This may be particularly important in the areas just prior to pinch roller 16, where the new layer of flattened tubular strip 22 is added, and compression roller 17, where compression is added as or just after the adhesive 24 achieves its initial set.

It may be helpful to support the underside or second portion of the loop 19, especially when the number of stacked layers required is large or the material used is relatively heavy. This compensates for the additional weight of the loop 19 which would cause the loop to be stretched tightly around the driving wheel 14 and idler wheel 13, resulting in the undesireable stretching of the adhesive line 24 discussed above. This supporting means for the underside second portion of the loop 19 may be an endless belt 32, as illustrated in FIG. 4. Belt 32 is mounted on rollers 34 which supports the underside of the loop 19. Other supporting means are possible such as a metal tray along which the loop could slide with relatively low friction.

If the distance required between points (A) and (C) is relatively large in order to allow sufficient time for an initial set to be achieved by the adhesive 24, it may be necessary to provide support for the upper side or first portion of the loop 19 in order to prevent sagging while the adhesive sets. A supporting belt 36 may be added between the platen 18 and just before point (C), or alternatively, the supporting belt 36 could extend to under point (A) and thereby replace the platen 18. The supporting belt 36 would be an endless belt slightly wider than the width of the loop 19 and would run on rollers 38.

Figure 5:
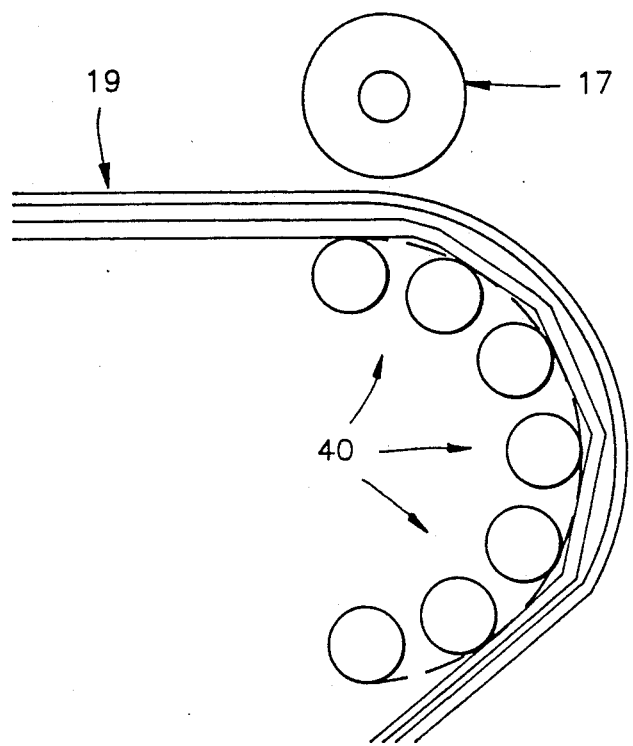
FIGS. 5 & 6 are partial, enlarged side views of an alternate drive wheel for the present invention.
Figure 6:
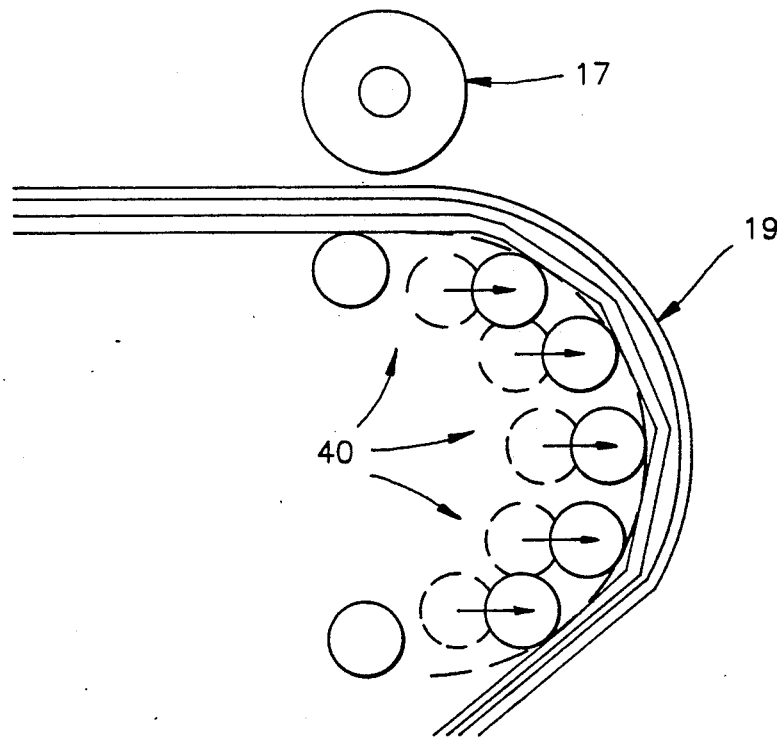

An additional modification to the basic process and apparatus is illustrated in FIGS. 5 & 6. In this embodiment, instead of a single large driving wheel 14, a series of smaller adjustable wheels 40 are used. These wheels 40 can be adjusted to conform to the shape of the loop 19 as it becomes distorted during the running of the process. Due to the momentum of the upper side of the loop 19, especially at high speeds, the path of the loop 19 as it passes around the driving wheel 14 will change. Instead of the simple circular curve which is generated at low speeds, a complex curve is created, which curve starts with a parabolic arc, transitioning into a short circular arc and then back to a parabolic arc, before finally changing into a shape approximating the long side of an ellipse as the loop 19 moves toward bottom center. The series of small adjustable wheels 40 are controlled by a positioning means (not shown) such as hydraulic cylinders or electromechanical controllers. As the shape of the loop 19 changes due to speed variations or increased mass of the loop 19 the small adjustable wheels 40 can be positioned to adapt to this shape change, as shown in FIG. 6.

As noted above, these adjustable wheels 40 are especially useful when the process is to be run at high speed, since the loop 19 will be more difficult to control due to increased dynamic forces. The adjustable wheels 40 also provide additional control of the loop 19 by closely approximating its shape. The adjustable wheels 40 have further utility to approximate the high speed shape of the loop 19 during start up of the process. This eliminates unwanted shape changes in the loop 19 as speed and mass increase to avoid control problems.

It should be understood that the sequence of steps disclosed above are not necessarily the required sequence. The methods illustrated are the preferred embodiments, however, the sequence of the steps may be altered in some cases, with the only requirement being that all steps are ultimately included. This will be more apparent from the appended claims defining the scope of the invention.

What is claimed is:

1. A method for producing continuous band expandable and collapsible shielding material having parallel hollow cells running perpendicular to the direction of expansion and collapse, comprising the steps of
   providing a strip of flattened tubular material;
   applying adhesive to the strip;
   winding the strip around support means to create a closed loop of a number of superimposed layers of bonded strip;
   tensioning a first portion of the loop such that it is in at least a substantially straight condition;
   reducing tension in a second portion of the loop starting at a first point near where the loop deflects from the straight condition of the first portion;
   feeding the strip initially to said loop at a second point to provide travel over at least part of said first portion by the strip while being in contact with the outer layer of the loop;
   selecting the duration of said travel over at east part of the first portion so that the adhesive, binding said strip to the outer layer of the loop, achieves at least an initial set;
   controlling said initial set and said reduction of tension so that after the deflecting point of the loop permanent displacement of the fed strip relative to the underlying strip layer is kept within a predetermined limit; and
   cutting said loop in a direction mainly perpendicular to the longitudinal direction of the bonded strips after a predetermined number of layers have been bonded so as to form said shielding material.

2. The method as in claim 1 wherein the adhesive is applied to the outer layer of the loop at a point before said second point.

3. The method as in claim 1 wherein the adhesive is applied to the strip before winding onto the loop.

4. The method as in claim 1 further comprising the step of supporting the first portion of the loop.

5. The method as in claim 1 further comprising the step of applying compression to the loop at said second point.

6. The method as in claim 1 further comprising the step of applying compression to the loop at said first point.

7. The method as in claim 1 further comprising the step of guiding the sides of the loop to ensure a uniform layering.

8. The method as in claim 1 wherein the tension in the first portion of the loop is increased by braking the support means.

9. The method as in claim 1 wherein the winding speed of the loop is sufficient to cause the loop to leave the support means immediately after said first point.

10. The method as in claim 1 wherein the step of providing a strip of flattened tubular material comprises the step of folding a flat strip of material into a tubular material.

11. A method for producing continuous band shielding material including the steps of providing a continuous generally flat tubular strip, applying adhesive to the tubular strip, winding the tubular strip around first and second support means to create a bonded loop of several layers, and cutting the loop of bonded tubular strip perpendicular to the longitudinal direction of the strips to form and expandable shielding material, the improvement comprising during the winding step the additional steps of:

tensioning the loop at a point before the next successive layer is added;

adding each successive layer under compression, before the first support means and after the second support means;

maintaining the loop under tension in a flat and straight condition until the adhesive achieves an initial set; and relaxing tension on the loop at a point before the loop curves back around the first support means.

12. An apparatus for producing continuous band expandable and collapsible shielding material having parallel hollow cells running perpendicular to the direction of expansion and collapse, comprising means for supplying flattened tubular strip; means for applying adhesive to a side of the flattened tubular strip; and means for winding and supporting a continuous loop of successively stacked layers of the flattened tubular strip bonded together by the applied adhesive, said winding and supporting means comprising first and second support means spaced apart by a predetermined distance such that said continuous loop comprises, in the winding direction, a first loop portion extending between said second support means and said first support means and a second loop portion extending between said first support means and said second support means; wherein said first support means comprises driving means for drivingly engaging said continuous loop and wherein said second support means exerts a braking force on said continuous loop so as to produce a tension in said first loop portion greater than the tension in said second loop portion and thereby straighten said first loop portion, and wherein said first support means is located a sufficient distance from a point where each successively stacked layer is added to said continuous loop to allow the applied adhesive to achieve an initial set in said first loop portion before each successive layer of the continuous loop passes around said first support means.

13. The apparatus as in claim 12, wherein first compressing means, comprising a pinch roller and a platen positioned to backup the loop in the area of the pinch roller, is positioned approximately at the point where each successively stacked layer is added.

14. The apparatus as in claim 12, wherein the strip supplying means comprises a supply reel for supplying flat strip material which has a larger width than that of the desired flattened tubular strip, and means for converting flat strip material into the desired flattened tubular strip.

15. The apparatus as in claim 14, wherein the converting means includes means for folding the flat strip material into the flattened tubular strip and wherein the flat strip material is approximately twice the width of the flattened tubular strip.

16. The apparatus as in claim 13, further comprising at least one second means for compressing the stacked loop of flattened tubular strip.

17. The apparatus as in claim 16, wherein the second compressing means is located above the second support means and includes a roller for compressing the stacked loop of flat tubular strip.

18. The apparatus as in claim 16, wherein the second compressing means is located above the first support means and includes a roller for compressing the stacked loop of flat tubular strip.

19. The apparatus as in claim 12, further comprising means for supporting the stacked loop between the first support means and the point where each successively stacked layer is added.

20. The apparatus as in claim 12, further comprising means for supporting the stacked loop after passing the first support means and before the second support means.

21. The apparatus as in claim 12, wherein said first support means comprises at least one driving wheel and said second support means comprises an idler wheel and further comprising means for braking the idler wheel.

22. The apparatus as in claim 12, wherein the first support means comprises a plurality of driving wheels each being independently and slideably adjustable along an axis parallel to the continuous loop whereby the configuration of the plurality of driving wheels may be adjusted to match the shape of the continuous loop.

23. An apparatus for producing continuous band expandable and collapsible shielding material having parallel hollow cells running perpendicular to the direction of expansion and collapse, comprising means for supplying flattened tubular strip; means for applying adhesive to a side of the flattened tubular strip; and first and second support means spaced by a predetermined distance for forming and supporting a continuous loop of successively stacked layers of the flattened tubular strip bonded together by the applied adhesive; wherein said first support means comprises a plurality of driving wheels each being independently and slideably adjustable along an axis parallel to the continuous loop whereby the configuration of the plurality of driving wheels may be adjusted to match the shape of the continuous loop, and wherein said first support means is located a sufficient distance from a point where each successively stacked layer is added to said continuous loop to allow the applied adhesive to achieve an initial set before each successive layer of the continuous loop passes around said first support means; and further wherein said second support means comprises an idler wheel.

* * * * *